United States Patent [19]

Branch

[11] Patent Number: 5,363,897

[45] Date of Patent: Nov. 15, 1994

[54] TUBELESS TIRE DEMOUNTING TOOLS

[76] Inventor: Gary E. Branch, Rte. 4, Box 216A, Rayville, La. 71269

[21] Appl. No.: 33,186

[22] Filed: Mar. 16, 1993

[51] Int. Cl.$^5$ ............................................. B60C 25/06
[52] U.S. Cl. ..................................... 157/1.3; 157/1.17
[58] Field of Search .................... 157/1, 1.1, 1.3, 1.17

[56] References Cited

U.S. PATENT DOCUMENTS

| 2,565,216 | 8/1951 | Fox | 157/1.17 |
| 5,123,470 | 6/1992 | Tran | 157/1.3 |

FOREIGN PATENT DOCUMENTS

| 504006 | 6/1920 | France | 157/1.3 |
| 21360 | of 1910 | United Kingdom | 157/1.17 |
| 296887 | 9/1928 | United Kingdom | 157/1.3 |
| 1314962 | 4/1973 | United Kingdom | 157/1.1 |

*Primary Examiner*—D. S. Meislin
*Attorney, Agent, or Firm*—John M. Harrison

[57] ABSTRACT

Tubeless tire demounting tools which include a dual handle roller tool, a double hook bracket tool and a shoe tool which are used in various combinations to demount vehicle tires from wheel rims. The double hook bracket tool is initially fitted on the rim flange of the wheel rim after the tire has been deflated and the dual handle roller tool is then positioned into engagement with the double hook bracket, between the tire and wheel rim to facilitate partial demounting of the top bead of the tire. The double hook bracket is then repositioned across a diameter of the wheel rim and the shoe tool is positioned in engagement with the double hook bracket between the tire and wheel rim for demounting the opposite tire beads of the tire from the wheel rim.

8 Claims, 2 Drawing Sheets

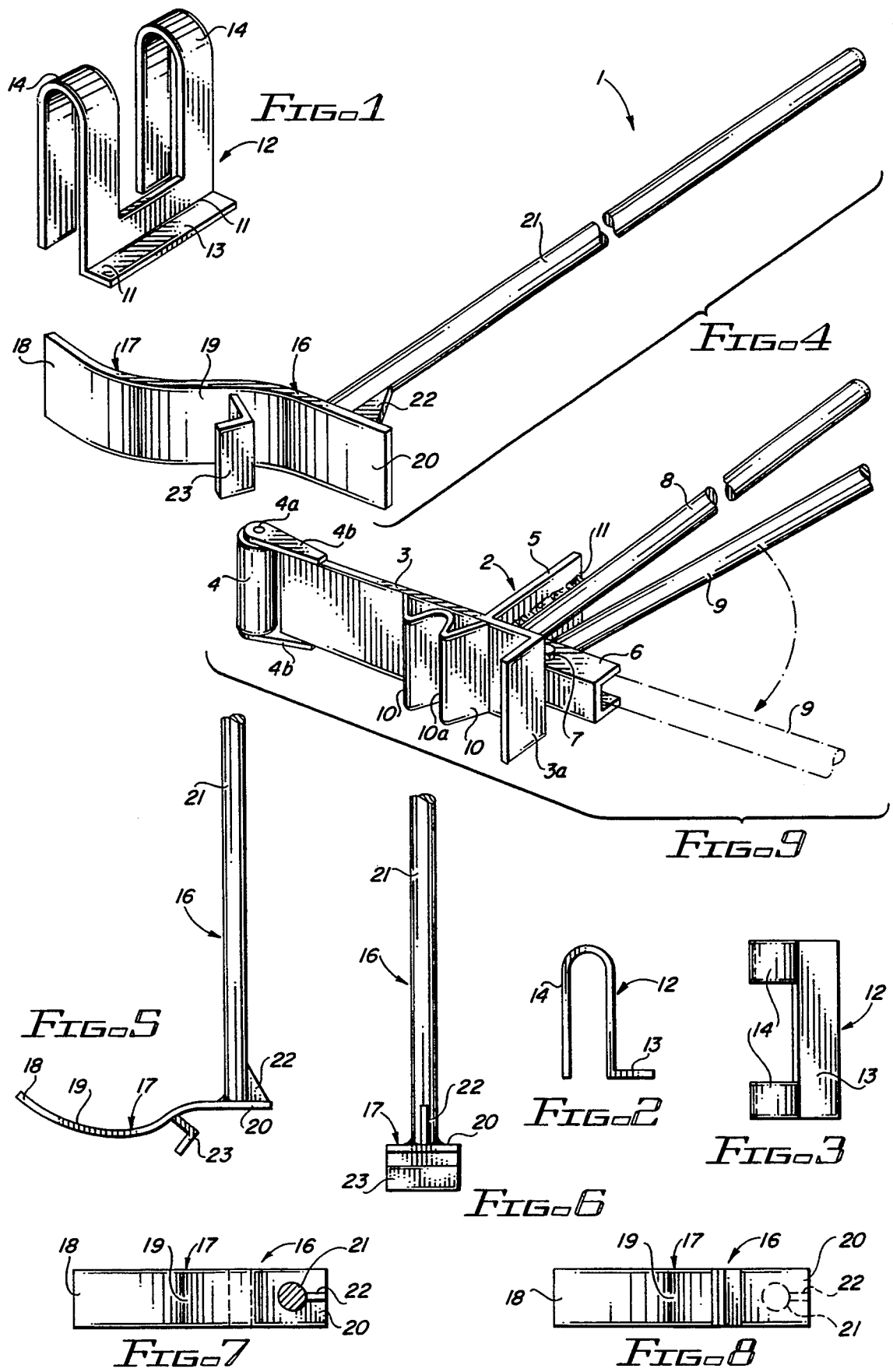

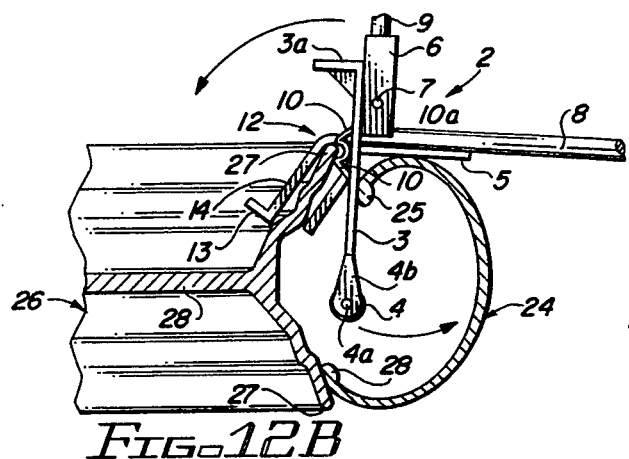
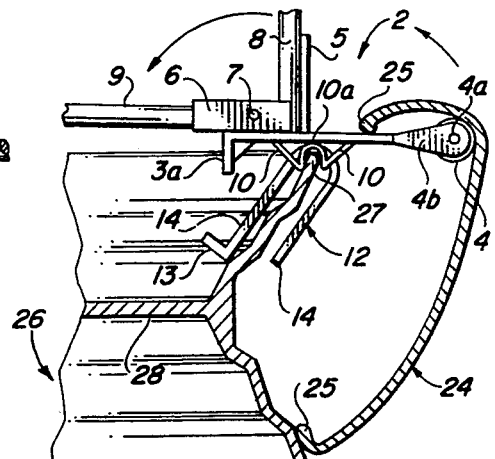
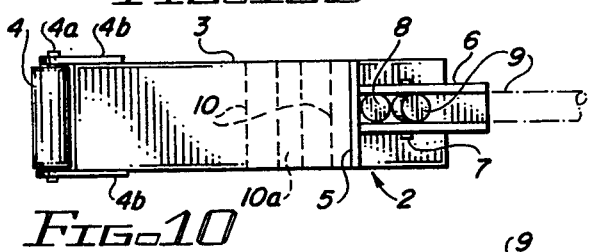
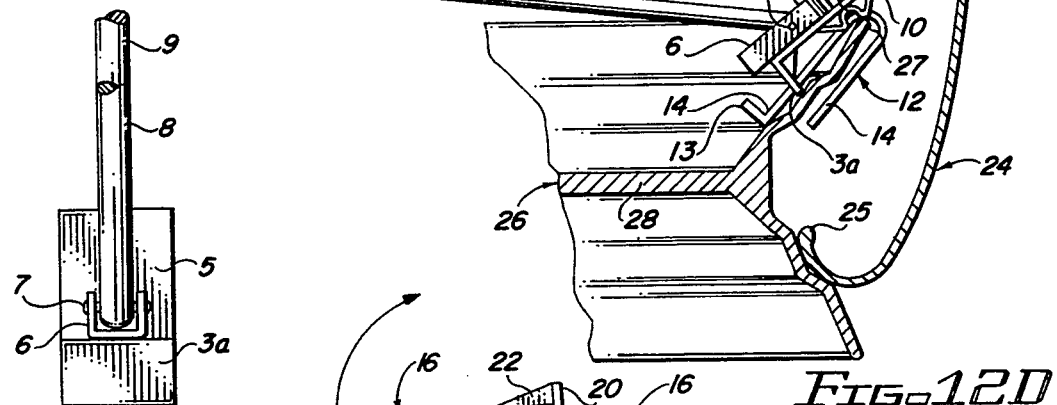
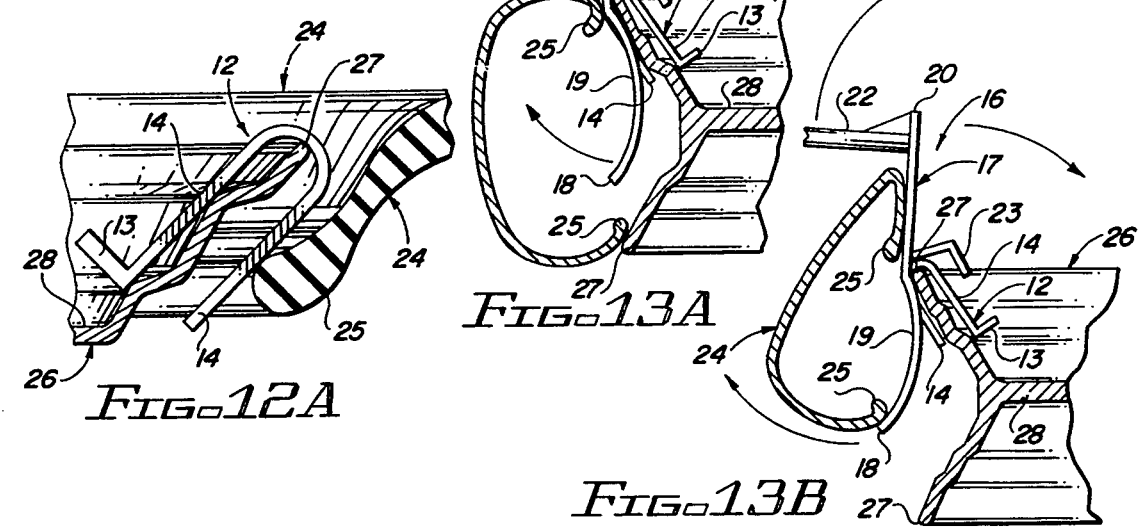

TUBELESS TIRE DEMOUNTING TOOLS

Background of the Invention

Field of the Invention

This invention relates to repair and replacement of tires on vehicle wheel rims and more particularly, to tubeless tire demounting tools which are used in various combinations to effect quick and efficient demounting of tires from the corresponding wheel rims. In a preferred embodiment the tubeless tire demounting tools are characterized by a dual handle roller tool, one of which handles is pivotally mounted to a roller tool base and the other fixed to the base, a double hook bracket for mounting on the wheel rim of the tire and a shoe tool having an elongated, curved plate shank and a plate handle fixed to the shank. Both the dual handle roller tool and the shoe tool are designed for engagement with the double hook bracket and the wheel rim to "break" the tire bead away from the wheel rim and demount the tire from the wheel rim. In a preferred embodiment of the invention the double hook bracket is initially positioned on the rim flange of a wheel rim between the wheel rim and tire and the dual handle roller tool is located to engage tile double hook bracket and tire, such that manipulation of the dual handles of the dual handle roller tool operates to "break" the tire bead away from the rim at the double hook bracket location. The double hook bracket is then relocated approximately across a diameter of the wheel rim to the opposite rim flange where it is repositioned between the wheel rim and tire. The shoe tool is then placed in engagement with the double hook bracket, between the wheel rim and tire, such that pressure applied to the fixed handle on the shoe tool breaks parallel tire beads simultaneously from the wheel rim to finally remove the tire from the wheel rim.

Demounting of tires from vehicle wheel rims and particularly, from truck wheel rims, is a laborious and sometimes dangerous task. Because of the pressure and force required to "break" the tire bead away from the rim, considerable leverage must normally be exerted by means of conventional tire irons and related tools to accomplish this purpose. If the engaging end of the tire iron slips from the tire bead or slides around the rim while still engaging the tire, serious injury can occur to the operator. Furthermore, semiautomated equipment designed to accomplish this task frequently malfunctions and is dangerous to operate, due to the rotary motion of the bead-removing lug which removes the bead from the rim flange. Typical of other known tools is the "BeadSaverSystem" (trademark), marketed by Gaither Tool Company, of Granite City, Ill., which utilizes a lever having tire-engaging implements at each end, a plate "beadkeeper" tool, a wedge and a clevis tool, which together are used to remove tires from truck and automobile wheel rims. Another system includes a "Beaver Tail" tool (trademark), also developed by the Gaither Tool Company of Granite City, Ill. The "Beaver Tail" device includes an elongated bar fitted with a bead-engagimg end and a pair of oppositely projecting outriggers fitted with rollers for engaging the tire bead resting the rollers on the rim and removing the tire from the rim. Still another tire-engaging tool is the "TNT-100" (trademark) tuneless truck tire mount/demount tool. The tool is actually a pair of tools, one of which includes an elongated bar having an offset at one end, terminated by a wedged-shaped engaging portion and the other tool characterized by an elongated, curved bar having a yoke portion at one end. These tools are used in combination to demount tires from wheel rims.

It is an object of this invention to provide tubeless tire demounting tools which are characterized by a dual handle roller tool, a double hook bracket tool and a shoe tool that are used in various combinations to demount a tire from a vehicle wheel rim.

Another object of the invention is to provide three demountimg tools designed for use in various combinations to demount a deflated tire from a wheel rim. A double hook bracket is initially inserted between the wheel rim and tire and used as a stabilizer in forcing the top tire bead away from the rim flange by operation of a dual handle roller tool. The bracket is then relocated across a diameter of the wheel rim and a shoe tool operates to disengage the tire from the rim at this point.

SUMMARY OF THE INVENTION

These and other objects of the invention are provided in tubeless tire demounting tools which include a dual handle roller tool fitted with a pair of handles, one of which is fixed and the other pivotally mounted to a corresponding roller tool base fitted with a roller at one end, a double hook bracket having a pair of curved hooks for engaging the rim flange of a tire wheel rim and a shoe tool characterized by a curved plate shank having a fixed handle attached to one end, wherein the double hook bracket is initially secured to the rim flange at a first selected location, the dual handle roller tool is positioned into engagement with the double hook bracket and the tire and is used to remove the tire bead at this location from the rim flange, the double hook bracket is relocated across the diameter of the rim to the opposite rim flange at a second selected location and the shoe tool is used to disengage opposite tire beads from the rim flange by inserting the curved plate shank between the rim flanges and the tire and exerting pressure on the shoe tool handle.

BRIEF DESCRIPTION OF THE DRAWINGS

The invention will be better understood by reference to the accompanying drawings, wherein:

FIG. 1 is a perspective view of a double hook bracket tool of the tubeless tire demounting tools of this invention;

FIG. 2 is a side view of the double hook bracket illustrated in FIG. 1;

FIG. 3 is a top view of the double hook bracket illustrated in FIGS. 1 and 2;

FIG. 4 is a bottom perspective view of a shoe tool element of the tubeless tire demounting tool of this invention;

FIG. 5 is a side view of the shoe tool illustrated in FIG. 4;

FIG. 6 is a rear view of the shoe tool illustrated in FIGS. 4 and 5;

FIG. 7 is a top sectional view of a shoe tool illustrated in FIGS. 4-6;

FIG. 8 is a bottom view of the shoe tool illustrated in FIGS. 4-7;

FIG. 9 is a bottom perspective view, partially in section, of a dual handle roller tool element of the tubeless tire demounting tools of this invention;

FIG. 10 is a top view of the dual handle roller tool illustrated in FIG. 9;

FIG. 11 is a rear view, partially in section, of the dual handle roller tool illustrated in FIGS. 9 and 10;

FIG. 12A is a sectional view of a tubeless tire and wheel rim and double hook bracket inserted between the tubeless tire and wheel rim for operating the dual handle roller tool and shoe tool of this invention;

FIG. 12B is a sectional view of the tubeless tire and wheel rim, with the dual handle roller tool inserted between the tubeless tire and wheel rim and positioned adjacent to the double hook bracket for partially removing the tubeless tire from the wheel rim;

FIG. 12C is a sectional view of the tubeless tire and wheel rim, more particularly illustrating a second step in removal of the tubeless tire from the wheel rim by operation of the dual handle roller tool;

FIG. 12D is a sectional view of the tubeless tire and wheel rim, more particularly illustrating a third step in removal of the tubeless tire from the wheel rim by operation of the dual handle roller tool;

FIG. 13A is a sectional view of the tubeless tire and wheel rim with the shoe tool inserted between the tubeless tire and wheel rim and positioned adjacent to the relocated double hook bracket, illustrating a first step in removing the opposite side of the tubeless tire from the wheel rim;

FIG. 13B is a sectional view of the tubeless tire and wheel rim, more particularly illustrating a final step in removal of the tubeless tire from the wheel rim using the shoe tool.

DESCRIPTION OF THE PREFERRED EMBODIMENTS

Referring to FIGS. 1–11, and initially to FIGS. 1–3 of the drawings, the tubeless tire demounting tools of this invention are generally illustrated by reference numeral 1. FIGS. 1–3 illustrate a double hook bracket element of the tubeless tire demounting tool, which double hook bracket 12 includes a flat bracket base 13 with a pair of spaced, curved bracket hooks 14 extending from the bracket base 13, as illustrated. FIGS. 4–8 furthest illustrate a shoe tool 16, which includes a curved shoe plate 17, defining a plate toe 18, a curved plate shank 19 and a flat plate heel 20. One end of a plate handle 21 is fixed to the plate heel 20 and is secured in position by a handle gusset 22. Furthermore, an L-shaped plate bracket 23 projects downwardly from the curved plate shank 19 in angular relationship, with the bottom portion of the plate bracket 23 projecting forwardly toward the plate toe 18, as illustrated. FIGS. 9, 10 and 11 further illustrate a dual handle roller tool 2 which includes a flat roller tool base 3, having a pair of spaced roller flanges 4b welded or otherwise secured to one end thereof for receiving a roller pin 4a that rotatably mounts a roller 4. The opposite end of the roller toot base 3 receives a downwardly-extending heel flange 3a and an outwardly-projecting, bifurcated handle collar 6, which receives a handle pin 7 for pivotally mounting one end of a pivoting handle 9 to tile handle collar 6. A base flange 5 projects upwardly from the roller tool base 3 between the handle collar 6 and the roller 4 and serves to support a fixed handle 8, which extends into the handle collar 6 immediately adjacent to the pivoting handle 9, but is welded to the base flange 5 by means of welds 11. Rim flanges 10 extend outwardly from the bottom of the roller tool base 3, forwardly of the heel flange 3a and are shaped to define a rounded flange cradle 10a. It will be appreciated from a consideration of FIG. 9 that the pivoting handle 9 may pivot from an upright position adjacent to the fixed handle 8, into substantial alignment with the handle collar 6 at a 90° angle with respect to the fixed handle 8, for purposes which will be hereinafter further described.

Referring now to FIG. 12A of the drawings, the tubeless tire demounting tools 1 of this invention are used to demount a tire 24 having upper and lower tire beads 25, from the spaced rim flanges 27 of a wheel rim 26, having a rim disc 28 in the center thereof. After the tire 24 is deflated, the double hook bracket 12 is positioned as illustrated in FIG. 12A, with the bracket hooks 14 extending from the inside of the wheel rim 26, such that the bracket base 13 projects inwardly of the wheel rim 26 above the rim disc 28. Accordingly, the curved portion of the spaced bracket hooks 14 engage the top one of the rim flanges 27 and the opposite ends of the bracket hooks 14 from the bracket base 13 serve to space the upper one of the beads 25 of the tire 24 from the wheel rim 26, as illustrated. When the double hook bracket 12 is in position as illustrated in FIG. 12A, the dual handle roller tool 2 is positioned to force the roller 4 in the roller tool base 3 downwardly between the upper one of the tire beads 25 and the spaced pair of bracket hooks 14, as illustrated in FIG. 12B. The pivoting handle 9 thus projects upwardly, while the fixed handle 8 projects substantially horizontally in 90° disposed relationship with respect to the pivoting handle 9. The flange cradle 10a is then seated on the top one of the rim flanges 27 between the bracket hooks 14. Accordingly, when the dual handle roller tool 2 is in the position illustrated in FIG. 12B, the pivoting handle 9 may be pivoted from the upright position illustrated in FIG. 12B, approximately 90°, over the rim disc 28 of the wheel rim 26, to the position illustrated in FIG. 12C, which causes the fixed handle 8 to rotate upwardly in the direction of the arrow to the approximate vertical position illustrated in FIG. 12C. This action effects contact between the roller 4 and the inner surface of the tire 24 and traversal of the roller 4 along this inner surface to displace the upper one of the tire beads 25 from the position illustrated in FIG. 12B to the position illustrated in FIG. 12C, thus "breaking" a portion of the upper one of the tire beads 25 from the top one of the rim flanges 27 in the wheel rim 26. The lower one of the tire beads 25 remains in contact with the lower one of the rim flanges 27, as further illustrated in FIG. 12C and the flange cradle 10a is stabilized on the upper one of the flanges 27 by the bracket hooks 14 of the double hook bracket 12. Referring now to FIG. 12B of the drawings, in order to further remove a portion of the upper one of the tire beads 25 from the top one of the rim flanges 27 of the wheel rim 26, the fixed handle 8 is moved from the substantially vertical position illustrated in FIG. 12C to the horizontal position adjacent to the pivoting handle 9. This movement of the dual handle roller tool 2 causes the roller 4 to further traverse the inside surface of the tire 24 and displace the upper one of the tire beads 25 further from tile top one of the rim flanges 27 in tile wheel rim 26 and causes the lower tire bead 25 to be displaced from the lower one of the rim flanges 27. The dual handle roller tool 2 and double hook bracket 12 are then removed from contact with the wheel rim 26 and tire 24 and the double hook bracket 12 is replaced between the tire 24 and the top one of the rim flanges 27 of the wheel rim 26, approximately across a diameter of the wheel rim 26 from its original position. Referring now to FIG. 13A of the drawings, the shoe tool 16 is then positioned to effect the final demounting procedure, with the plate toe 18 and plate shank 19 segments of the shoe plate 17 inserted between the upper one of the tire beads 25 and the top one of the rim flanges 27 of the wheel rim 26, to seat the plate bracket 23 on the top one of the rim flanges 27 between the spaced bracket hooks 14. The plate handle 21 of the shoe tool 16 is then rotated upwardly from a substantially horizontal position as illustrated in the arrow in FIG. 13A, to initially displace the upper one of the tire beads 25 from the top one of the rim flanges 27 and displace the tire 24 upwardly with respect to the wheel rim 26. Referring now to FIG. 13B, the shoe tool 16 is then manipulated to cause the plate toe 18 of the shoe plate 17 to engage the lower one of the tire beads 25. The plate handle 21 is then again manipulated upwardly as illustrated in FIG. 13b to displace the lower one of the tire beads 25 from the bottom ones of the rim flanges 27 and remove the tire 24 from the wheel rim 26. As in the case of the dual handle roller tool 2, pivoting of the shoe plate 17 with respect to the wheel rim 26 is stabilized by locating the flange-engaging plate bracket 23 between the spaced, parallel bracket hooks 14 of the double hook bracket 12.

It will be appreciated by those skilled in the art that the tubeless tire demounting tools of this invention serve to quickly, efficiently and safely remove tubeless tires, including truck and automobile tires, from wheel rims. The demounting tools are characterized by safety by the operator, since maximum leveraging is accomplished by use of the dual handle roller tool 2 and the shoe tool 16 in combination with the double hook bracket 12, to facilitate removal of various portions of the tire 24 from the wheel rim 26 without the exertion of extreme pressure. This is important in removing tires from wheel rims, since application of extreme pressure frequently causes injury to the operator using conventional systems.

It will be further appreciated by those skilled in the art that the tubeless tire demounting tools can be manufactured in one standard size to fit various sized tires, including truck and automobile tires, as desired. Alternatively, a special set of tools can be manufactured for demounting tubeless tires used on automobiles, including compact cars, trucks and the like, as well as those used on larger trucks, buses, and other vehicles, as desired. Furthermore, the tubeless tire demounting tools can be used without the necessity of lifting or repositioning the tire from a flat position on a supporting surface. Lifting tires is a major cause of injuries, and back injuries in particular. While the preferred embodiments of the invention have been described above, it will be recognized and understood that various modifications may be made in the invention and the appended claims are intended to cover all such modifications which may fall within the spirit and scope of the invention.

Having described my invention with the particularity set Forth above, what is claimed is:

1. Tools for demounting a deflated tire from a wheel rim having an upper flange and a lower flange, comprising a bracket having a bracket base and a pair of generally U-shaped bracket hooks projecting from said bracket base in fixed relationship, said bracket base positioned inside the periphery of the wheel rim and said bracket hooks extending around the upper flange of the wheel rim and outside of the wheel rim between the upper flange and the tire at a first selected location on the wheel rim and the tire; a roller tool having an elongated, flat base, a roller rotatably mounted on one end of said flat base, a fixed handle and a pivoting handle carried by said flat base in spaced, fixed and pivoting relationship, respectfully, with respect to said roller, and a cradle shaped in said flat base on the opposite side of said flat base from said fixed handle and said pivoting handle, with said base extended between said bracket and the tire, said roller engaging the inside surface of the tire and said cradle engaging the top flange of the wheel rim between said bracket hooks, whereby the tire is partially released from the wheel rim responsive to manipulation of said fixed handle and said pivoting handle over the tire and the wheel rim; and a shoe tool having a curved plate and a shoe tool handle fixedly carried by said curved plate, wherein said bracket is relocated on the wheel rim at a second selected location between the tire and the wheel rim and spaced from said first selected location, said curved plate is extended between said bracket hooks and the tire at said second selected location and the tire is removed from the wheel rim responsive to manipulation of said shoe tool handle over the tire and the wheel rim.

2. The tools of claim 1 wherein said curved plate in said shoe tool further comprises a substantially flat heel segment for receiving said shoe tool handle in fixed relationship and a curved shank segment extending from said flat heel segment, said curved shank segment terminating at a toe segment.

3. The tools of claim 1 wherein:
    (a) said curved plate in said shoe tool further comprises a substantially flat heel segment for receiving said shoe tool handle in fixed relationship and a curved shank segment extending from said flat heel segment, said curved shank segment terminating at a toe segment; and
    (b) said bracket base of said bracket is located inside the periphery of the wheel rim, with said bracket hooks projecting over the wheel rim and outside the periphery of the wheel rim adjacent to said base of said roller tool means.

4. The tools of claim 1 wherein said shoe tool further comprises an L-shaped bracket projecting from the opposite side of said plate from said handle for engaging the wheel rim between said bracket hooks and removing the tire from the wheel rim responsive to manipulation of said shoe tool handle.

5. The tools of claim 1 wherein:
    (a) said curved plate in said shoe tool further comprises a substantially flat heel segment for receiving said shoe tool handle in fixed relationship and a curved shank segment extending from said flat heel segment, said curved shank segment terminating at a toe segment;
    (b) said bracket base of said bracket is located inside the periphery of the wheel rim, with said bracket hooks projecting over the wheel rim and outside the periphery of the wheel rim adjacent to said base of said roller tool means; and
    (c) said shoe tool further comprises an L-shaped bracket projecting from said plate shank of said plate for engaging the wheel rim between said bracket hooks and removing the tire from the wheel rim responsive to manipulation of said shoe tool handle.

6. Tools for demounting a deflated tire from a wheel rim having an upper and lower flange, comprising a stabilizing bracket having a bracket base and a pair of generally U-shaped bracket hooks projecting from said bracket base in fixed relationship, said bracket base positioned inside the periphery of the wheel rim and said bracket hooks extending around the upper flange of the wheel rim and outside the wheel rim between the upper flange and the tire at a first selected location on the wheel rim and the tire; a roller tool having an elongated, flat base, a roller rotatably mounted on one end of said flat base, a fixed handle and a pivoting handle carried by said flat base in spaced, fixed and pivoting relationship, respectfully, with respect to said roller, and a cradle shaped in said flat base on the opposite side of said flat base from said fixed handle and said pivoting handle, with said base extended between said stabilizing bracket and the tire, said roller engaging the inside surface of the tire and said cradle engaging the top flange of the wheel rim between said bracket hooks, whereby the tire is partially released from the wheel rim responsive to manipulation of said fixed handle and said pivoting handle over the tire and the wheel rim; and a shoe tool having a curved plate, a shoe tool handle fixedly carried by said curved plate and a plate bracket carried by said curved plate, wherein said stabilizing bracket is relocated on the wheel rim at a second selected location between the tire and the wheel rim and spaced substantially across a diameter of the wheel rim from said first selected location, said curved plate is extended between said bracket hooks and the tire at said second selected location with said plate bracket engaging the upper flange of the wheel rim between said bracket hooks and the tire is removed from the wheel rim responsive to manipulation of said shoe tool handle over the tire and the wheel rim.

7. The tools of claim 6 wherein said curved plate in said shoe tool further comprises a substantially flat heel segment for receiving said shoe tool handle in fixed relationship and a curved shank segment extending from said flat heel segment for receiving said plate bracket, said curved shank segment terminating at a toe segment.

8. The tools of claim 6 wherein:
(a) said curved plate in said shoe tool further comprises a substantially flat heel segment for receiving said shoe tool handle in fixed relationship and a curved shank segment extending from said flat heel segment for receiving said plate bracket, said curved shank segment terminating at a toe segment; and
(b) said bracket base of said stabilizing bracket is located inside the periphery of the wheel rim, with said bracket hooks projecting over the wheel rim and outside the periphery of the wheel rim adjacent to said base of said roller tool means.

* * * * *